(12) United States Patent
Maria

(10) Patent No.: US 8,527,653 B2
(45) Date of Patent: Sep. 3, 2013

(54) GGSN FRONT END PROCESSOR (GFEP) SYSTEM FOR SCADA INTER-DOMAIN COMMUNICATIONS

(75) Inventor: Arturo Maria, Bellevue, WA (US)

(73) Assignee: AT&T Mobility II LLC, Atlanta, GA (US)

(*) Notice: Subject to any disclaimer, the term of this patent is extended or adjusted under 35 U.S.C. 154(b) by 366 days.

(21) Appl. No.: 12/941,250

(22) Filed: Nov. 8, 2010

(65) Prior Publication Data
US 2012/0117266 A1    May 10, 2012

(51) Int. Cl.
G06F 15/16 (2006.01)
(52) U.S. Cl.
USPC ........... 709/232; 370/328; 370/329; 370/466; 370/467; 700/291; 700/295
(58) Field of Classification Search
USPC ................. 709/232; 370/466, 467, 328, 329; 700/291, 295
See application file for complete search history.

(56) References Cited

U.S. PATENT DOCUMENTS

| | | | |
|---|---|---|---|
| 8,219,214 B1* | 7/2012 | Mimlitz | 700/9 |
| 8,335,596 B2* | 12/2012 | Raman et al. | 700/295 |
| 2002/0090001 A1* | 7/2002 | Beckwith | 370/466 |
| 2003/0147420 A1* | 8/2003 | Beckwith | 370/466 |
| 2005/0175031 A1* | 8/2005 | Harley | 370/466 |
| 2006/0034329 A1* | 2/2006 | Miller et al. | 370/467 |
| 2006/0052099 A1* | 3/2006 | Parker | 455/426.1 |
| 2009/0028184 A1* | 1/2009 | Carpman et al. | 370/466 |
| 2009/0138100 A1* | 5/2009 | Khorramshahi | 700/22 |
| 2009/0144425 A1* | 6/2009 | Marr et al. | 709/226 |
| 2010/0158026 A1* | 6/2010 | Valmikam et al. | 370/401 |
| 2010/0195574 A1* | 8/2010 | Richeson et al. | 370/328 |
| 2010/0260125 A1* | 10/2010 | Lee et al. | 370/329 |
| 2010/0292856 A1* | 11/2010 | Fujita | 700/291 |
| 2011/0010016 A1* | 1/2011 | Giroti | 700/291 |
| 2011/0075655 A1* | 3/2011 | Sahin et al. | 370/352 |
| 2011/0303310 A1* | 12/2011 | Klicpera | 137/551 |
| 2012/0063415 A1* | 3/2012 | Yee | 370/331 |

* cited by examiner

*Primary Examiner* — Ario Etienne
*Assistant Examiner* — Michael C Lai
(74) *Attorney, Agent, or Firm* — Parks IP Law LLC; Jennifer P. Medlin, Esq.

(57) ABSTRACT

A general packet radio service (GPRS) gateway support node (GGSN) front end processor (GFEP) system includes an input/output (I/O) interface configured to receive data directly from at least one supervisory control and data acquisition (SCADA) device. The received data is associated with at least one of monitoring and controlling an advanced metering infrastructure (AMI) device. The GFEP system also includes a GFEP processor operatively coupled to the I/O interface, the GFEP processor is configured to perform a protocol conversion to facilitate transfer of the received data from the SCADA device to a GGSN of a wireless communications network, and provide the received data to the GGSN for delivery via the wireless communications network to the AMI device.

17 Claims, 8 Drawing Sheets

GGSN FRONT END PROCESSOR (GFEP) SYSTEM FOR SCADA INTER-DOMAIN COMMUNICATIONS

TECHNICAL FIELD

The embodiments presented herein relate generally to Supervisory Control and Data Acquisition (SCADA) systems and, more particularly, to a General Packet Radio Service (GPRS) Gateway Support Node (GGSN) Front End Processor (GFEP) system for SCADA inter-domain communications.

BACKGROUND

SCADA systems monitor and control dispersed assets involved in industrial, infrastructure, or facility-based processes. SCADA systems are used to monitor and control industrial processes such as manufacturing, production, power generation, fabrication, refining, and the like. Many public and private infrastructures rely on SCADA systems for monitoring and controlling processes such as water treatment and distribution, wastewater collection and treatment, oil distribution, natural gas distribution, electric power transmission and distribution, and the like. Facilities such as buildings, airport, ships, space stations, private homes, communities, and the like also sometime rely on SCADA systems to monitor and control security access, energy consumption, and heating, ventilation, and air conditioning (HVAC) systems, for example.

SCADA systems typically include a control center. SCADA control centers include a human machine interface (HMI) by which a human operator can observe process data and provide input for remote control of a process if necessary, databases for storing historical process data, servers for communicating via communication routers with field deployments of SCADA devices, such as remote telemetry units (RTUs).

The RTUs connect to physical equipment such as meters, sensors, switches, valves, probes, and the like. RTUs convert electrical signals from the physical equipment to digital values such as to identify the open/closed status from a switch or a valve, and conduct measurements such as of pressure, flow, voltage, or current.

SUMMARY

According to one exemplary embodiment, a general packet radio service (GPRS) gateway support node (GGSN) front end processor (GFEP) system includes an input/output (I/O) interface configured to receive data directly from at least one supervisory control and data acquisition (SCADA) device. The received data is for at least one of monitoring and controlling an advanced metering infrastructure (AMI) device. The GFEP system also includes a GFEP processor that is operatively coupled to the I/O interface. The GFEP processor being configured to perform a protocol conversion to facilitate transfer of the received data from the SCADA device to a GGSN of a wireless communications network and to provide the received data to the GGSN for delivery via the wireless communications network to the AMI device.

In one embodiment, the protocol conversion is performed at a data link layer. For example, the data link layer protocol conversion may be from a data link layer protocol used by the at least one SCADA device such as Distributed Network Protocol (DNP), Modbus, Modbus X, or Multispeak to another protocol used by the GGSN, such as a data link layer protocol of the Internet Protocol Suite, In one embodiment, the GFEP system further includes a GFEP provisioning manager that is operatively coupled to the GFEP processor. The GFEP provisioning manager, in one embodiment, is configured to provision at least one GFEP connection with configuration parameters including, for example, at least one of a connection type, a protocol used, a source address, a destination address, and a transmission restriction.

In one embodiment, the GFEP system further includes a GFEP security catalog database configured to store a security profile for the at least one GFEP connection. In one embodiment, each security profile includes at least one of a connection type, a SCADA device characteristic, an allowed protocol, an allowed address, a data transmitted amount, and a data received amount.

In one embodiment, the GFEP system further includes a GFEP security manager that is operatively coupled to the GFEP processor and the GFEP security catalog database. The GFEP security manager, in one embodiment, is configured to receive, in response to a particular GFEP connection of the at least one GFEP connection between the SCADA device and the GFEP system being initiated, a request for security information from the GFEP provisioning manager, fetch, in response to the request for security information, the security profile associated with the SCADA device from the GFEP security catalog database, and forward the security profile associated with the SCADA device to the GFEP provisioning manager. The GFEP provisioning manager is further configured to use the security profile to provision the particular GFEP connection.

In one embodiment, the GFEP processor is part of the GGSN.

According to another exemplary embodiment, a network architecture for facilitating inter-domain communications between a SCADA domain and a wireless service provider domain includes a GFEP system configured to perform a protocol conversion to facilitate transfer of data received from the SCADA domain to the wireless service provider domain and to provide the data to the GGSN.

In one embodiment, the network architecture further includes at least one SCADA device operating in the SCADA domain. The GFEP system is further configured to receive the data from the at least one SCADA device.

In one embodiment, the protocol conversion is performed at a data link layer. For example, the data link layer protocol conversion may be from a data link layer protocol used by the at least one SCADA device such as Distributed Network Protocol (DNP), Modbus, Modbus X, or Multispeak to another protocol used by the GGSN, such as a data link layer protocol of the Internet Protocol Suite.

In one embodiment, the network architecture further includes at least one AMI device operating in an AMI domain that is in communication with the wireless service provider domain. In one embodiment, the GGSN is configured to receive the data from the GFEP system and provide the data to the at least one AMI device via a wireless communications network.

In one embodiment, the at least one AMI device is a smart grid device.

In one embodiment, the GFEP system is in communication with the GGSN.

In one embodiment, the GFEP system is integrated within the GGSN.

According to another exemplary embodiment, a method for operating a GFEP system to facilitate inter-domain communications between a SCADA domain and a wireless service provider domain includes performing a protocol conversion to facilitate transfer of data received from a SCADA device of the SCADA domain to a GGSN of the wireless service provider domain and providing the data to the GGSN for delivery via a wireless communications network of the wireless service provider domain to an AMI device.

In one embodiment, the method further includes provisioning a GFEP connection of the GFEP system to the SCADA device with configuration parameters including at least one of a connection type, a protocol used, a source address, a destination address, and a transmission restriction. In one embodiment, the GFEP connection is provisioned in part using a security profile associated with the SCADA device, the security profile including at least one of a connection type, a SCADA device characteristic, an allowed protocol, an allowed address, a data transmitted amount, and a data received amount.

In one embodiment, the protocol conversion is performed at a data link layer. For example, the data link layer protocol conversion may be from a data link layer protocol used by the at least one SCADA device such as Distributed Network Protocol (DNP), Modbus, Modbus X, or Multispeak to another protocol used by the GGSN, such as a data link layer protocol of the Internet Protocol Suite.

DETAILED DESCRIPTION

As required, detailed embodiments are disclosed herein. It must be understood that the disclosed embodiments are merely exemplary examples that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials, or methods have not been described in detail in order to avoid obscuring the embodiments disclosed herein. Therefore, specific structural and functional details disclosed herein are not to be interpreted as limiting, but merely as a basis for the claims and as a representative basis for teaching one skilled in the art to variously employ the disclosed embodiments.

Typical Network Configuration

Figure 1:
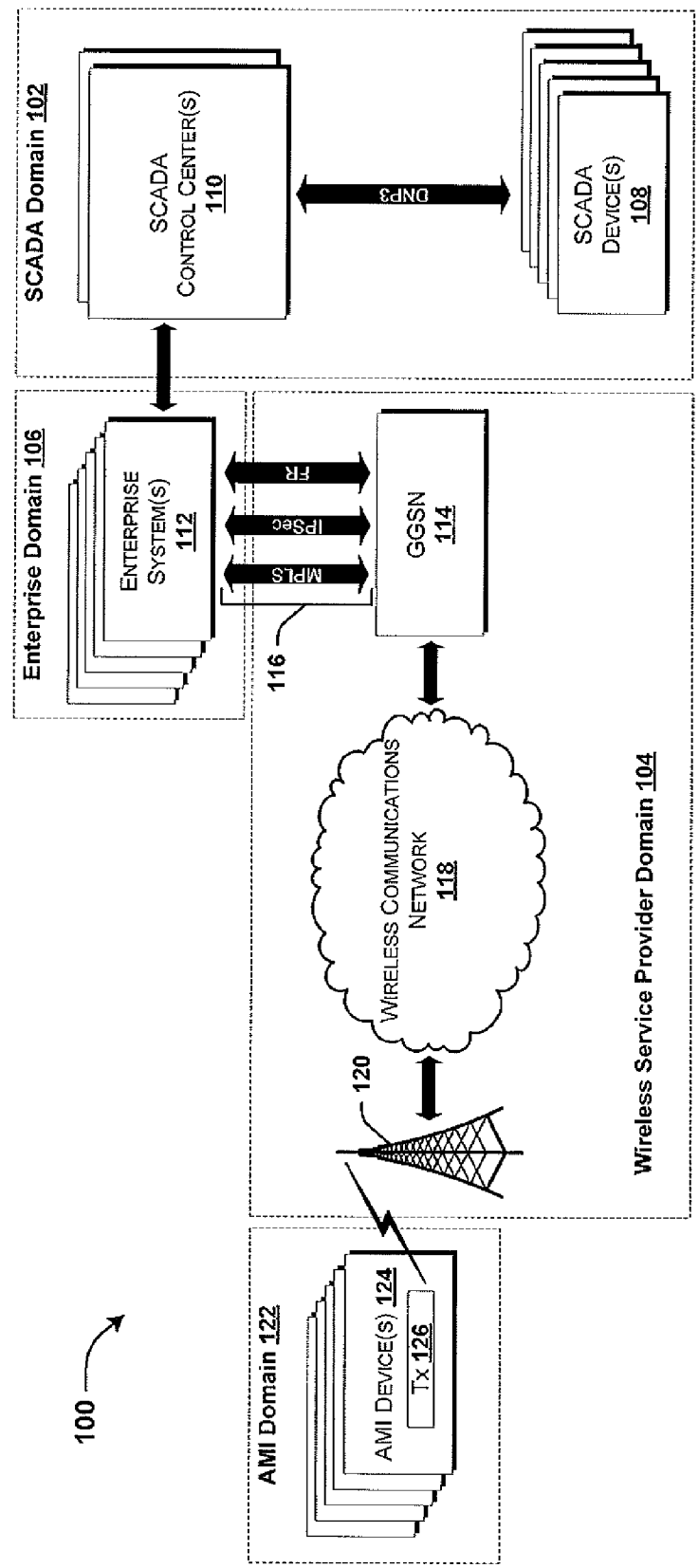
FIG. 1 schematically illustrates a network for facilitating communications between a Supervisory Control and Data Acquisition (SCADA) domain and a wireless service provider domain via an enterprise domain, according to a typical network configuration.

Referring now to the drawings in which like numerals represent like elements throughout the several figures, FIG. 1 schematically illustrates a network 100 for facilitating inter-domain communications between a Supervisory Control and Data Acquisition (SCADA) domain 102 and a wireless service provider domain 104 via an enterprise domain 106. In this typical network configuration, one or more SCADA devices 108 are configured to communicate with one or more SCADA control centers 110 which, in turn, communicate with one or more enterprise systems 112 operating in the enterprise domain 106. The enterprise systems 112 communicate with the wireless service provider domain 104 and, particularly, a General Packet Radio Service (GPRS) Gateway Support Node (GGSN) 114 via various mechanisms 116, such as multiprotocol label switching (MPLS), frame relay, or Internet Protocol Security (IPSec). The GGSN 114 provides connectivity between enterprise data networks (not shown) of the enterprise domain 106 and the wireless service provider domain 104. The GGSN 114 may also provide connectivity to public data networks such as the Internet (not shown).

The GGSN 114, in some embodiments, is part of a wireless communications network 118, although it is illustrated as a separate element for convenience. The GGSN 114 interfaces with other network elements of the wireless communications network 118 such as core circuit network elements and core packet network elements. The wireless communications network 108 may operate using telecommunications standards such as Global System for Mobile communications (GSM) and a Universal Mobile Telecommunications System (UMTS) to facilitate transmission of data received at the GGSN 114 from the SCADA devices 106 via the SCADA domain 102 and the enterprise domain 106 to the wireless service provider domain 104. The wireless communications network 118 may alternatively or additionally use any existing, developing, or yet to be developed telecommunications technologies. Some examples of other suitable telecommunications technologies include, but are not limited to, networks utilizing Time Division Multiple Access (TDMA), Frequency Division Multiple Access (FDMA), Wideband Code Division Multiple Access (WCDMA), CDMA2000, Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

The wireless communications network 118 also interfaces with one or more radio access networks (RANs) 120 which, in turn, are in communication with an automated metering infrastructure (AMI) domain 122 and, particularly, with one or more AMI devices 124 via respective AMI device transceivers 126. The RAN 120 is configured in accordance with the wireless telecommunications standards supported by the wireless communications network 118. The various domains 102, 104, 106, 122 are now described in greater detail.

The SCADA domain 102 generally includes systems that monitor and control dispersed assets involved in industrial, infrastructure, or facility-based processes. To that end the illustrated SCADA domain 102 includes one or more control centers 110, each of which includes one or more human machine interfaces (HMIs) such as computer terminals by which human operators can observe process data and provide input for remote control and monitoring of a process. The control centers 110 also include databases for storing process data. The control centers 110 also include servers for communicating via communication routers with field deployments of the SCADA devices 108. Communication between the control centers 110 and the SCADA devices 108 may be facilitated by an ASYNC-based protocol such as Distributed Network Protocol (DNP) version 3, as illustrated, or other protocols such as Modbus, Modbus X, or Multispeak. Communications between the SCADA control centers 110 and the SCADA devices 108 are typically handled by dedicated lines.

Presently, in order for AMI devices such as the illustrated AMI devices 124 in the AMI domain 122 to communicate with the SCADA devices 108 in the SCADA domain 102, data transmissions must traverse wireline connections or, in the illustrated example, the wireless service provider domain 104 via the GGSN 114 to the enterprise systems 112 in the enterprise domain 106, and the SCADA control centers 110 in the SCADA domain 102. That is, there is no inter-domain communications capability directly between the SCADA domain 102 and the wireless service provider domain 104. This can cause latency concerns, interoperability problems, and increased cost due to the number of systems needed to be maintained to facilitate such communications, among other problems.

The SCADA devices 108 are used to automate processes for which human control is impractical, impossible, or costly, for example, via human meter readers. The SCADA devices 108 may be used in association with electric power generation, transmission, and/or distribution. For example, electric utilities typically use SCADA devices to detect current flow and line voltage, to monitor the operation of circuit breakers, and to manipulate online and offline settings for the power grid. The SCADA devices 108 may be used in association with water and sewage treatment and/or distribution. For example, state and municipal water utilities typically use SCADA devices to monitor and regulate water flow, reservoir levels, pipe pressure, and like factors. The SCADA devices 108 may also be used to control heating, ventilation, and air conditioning (HVAC) systems, refrigeration units, lighting systems, security systems, entry systems, defense systems, and the like. Other use cases for the SCADA devices 108 include, for example, monitoring and quality control of manufacturing processes, fabrication processes, refining processes, and regulation of automation units and robotic systems. The SCADA devices 108 may also be used in transit functions such as to regulate electricity in subways, trams, and trolley buses, as well as other transit functions such as to automate traffic signals for rail systems, track and locate trains and buses, control railroad crossing gates, regulate traffic lights, control traffic flow, and detect out-of-order signals from traffic lights. The SCADA devices 108 are also useful in managing, monitoring, and/or controlling other equipment types known to those skilled in the art.

Referring now to the enterprise domain 106, the enterprise systems 112 include systems (e.g., servers, databases, billing system, charging system, customer service system, and the like) of enterprises such as utilities, manufacturers, transit authorities, communications service providers, and others that utilize SCADA devices for monitoring and controlling remote assets. The enterprise domain 106 also includes enterprise networks (not shown) to facilitate communications among the enterprise systems 112, with external data network such as the Internet, and the wireless service provider domain 104 via the GGSN 114.

The wireless service provider domain 104 provides wireless services to postpaid and/or prepaid customers in addition to facilitating wireless data communications between the AMI domain 122 and the enterprise domain 106, the latter operating as an intermediary to the SCADA domain 102.

The AMI domain 122 includes the AMI devices 124 such as devices configured to measure, collect, and analyze processes, for example, the usage of a metered utility provided by an enterprise of the enterprise domain 106 and communicate data associated therewith via the respective AMI device transceivers 126 to the wireless service provider domain 104 through the RAN 120 and ultimately back to the SCADA domain 102. The AMI devices 124 include electric meters, gas meters, heat meters, water meters, and various other metering devices, sensors, smart grid devices, and the like.

Network Configuration Using Discrete GFEP System

Figure 2:
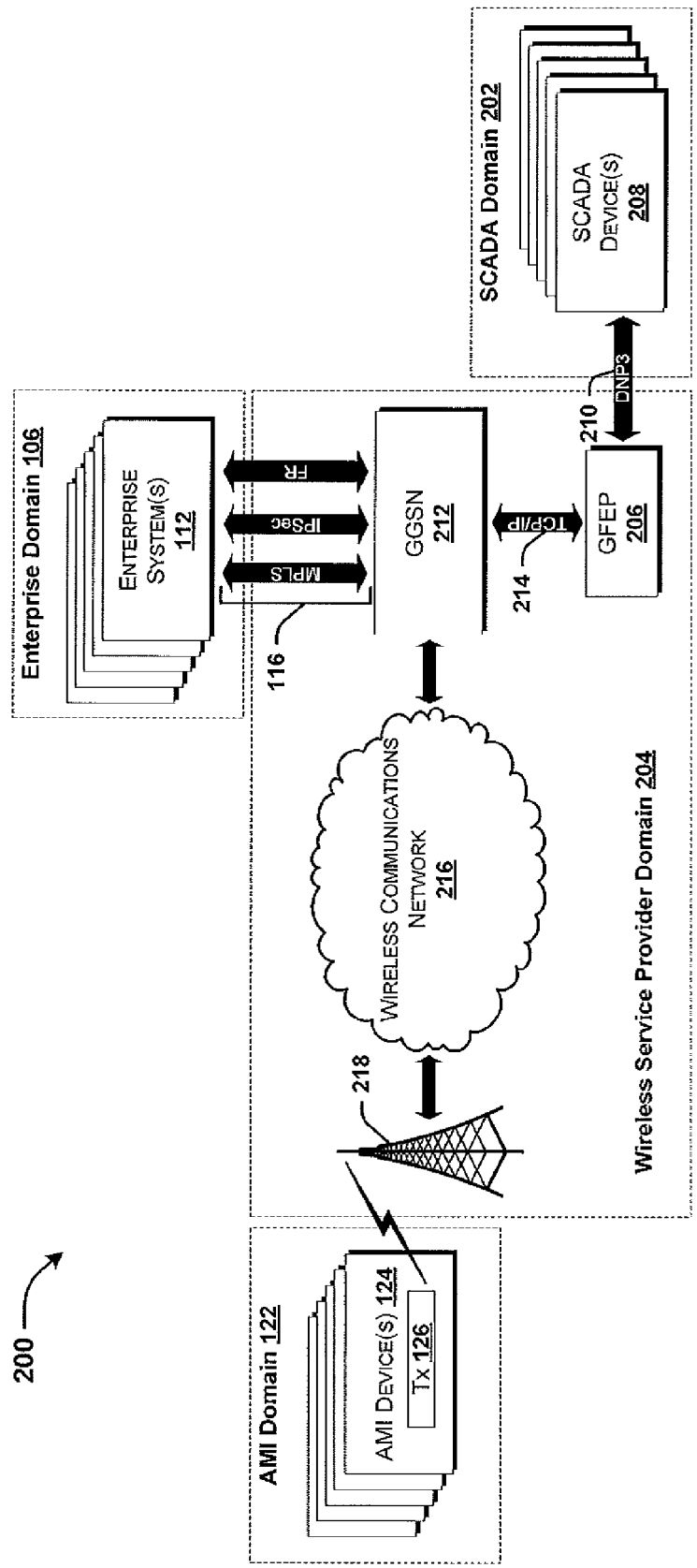
FIG. 2 schematically illustrates a network for facilitating inter-domain communications between a SCADA domain and a wireless service provider domain via a General Packet Radio Service (GPRS) Gateway Support Node (GGSN) Front End Processor (GFEP) system, according to one embodiment.

Turning now to FIG. 2, a network 200 for facilitating inter-domain communications directly between a SCADA domain 202 and a wireless service provider domain 204 via a GPRS Gateway Support Node (GGSN) Front End Processor (GFEP) 206 is illustrated, according to one embodiment.

The SCADA domain 202 includes one or more SCADA devices 208 that are similar to those described above with reference to the SCADA devices 108 of FIG. 1. Instead of interfacing with a SCADA control center (e.g., the SCADA control center 110), the SCADA devices 208 are configured to interface with the GFEP 206 directly, thereby bypassing the need for a SCADA control center and further intermediate communications through the enterprise domain 106. The GFEP 206 performs appropriate protocol conversion at layer 2, the data link layer of the Open Systems Interconnection (OSI) model. In particular, the GFEP 206 converts communications received from the SCADA devices 208 according to DNP3, as illustrated, or other protocol such as Modbus, Modbus X, Multispeak, or similar protocol to another data link protocol useable by the GGSN, such as a data link layer protocol of the Internet Protocol Suite (TCP/IP), as in the illustrated embodiment. The GFEP 206, in some embodiments, includes an embedded SCADA application to perform the protocol conversion.

The GGSN 212, like the GGSN 114 of FIG. 1, can communicate with the enterprise domain 106, as needed, using the mechanisms 116 such as MPLS, frame relay, and/or IPSec. The GGSN 212, also like the GGSN 114, in some embodiments, is part of a wireless communications network which, in the illustrated embodiment, is the wireless communications network 216. Functionally, with respect to communications to and from the enterprise domain 106 and to and from the wireless communications network 216, the GGSN 212 is the same as the GGSN 114. The GGSN 212, however, includes additional functionality to interface with the GFEP 206 for communicating data received from the SCADA devices 208 and directed to the SCADA devices 208 from the AMI domain 122 without the need for a SCADA control center or intermediate communications through the enterprise domain 106.

In the illustrated embodiment, the GFEP 206 interfaces with a single GGSN 212. In other embodiments, the GFEP 206 may alternatively interface with two or more GGSNs to facilitate inter-domain communications between the SCADA domain 202 and the wireless service provider domain 204. In these embodiments, some of the GGSNs may be geographically dispersed while others may be co-located to facilitate access within the coverage area of the wireless communications network 216. Multiple GFEP systems, each configured to interface with one or more GGSNs, are also contemplated.

GFEP systems may be shared among various enterprises engaged in remote monitor and control via the SCADA devices 208 and the AMI devices 124 or may be dedicated to particular enterprises. In some embodiments, the GFEP systems are provided by a wireless service provider as a value-add which may garner higher fees for wireless data transmission via a GFEP system as opposed to the typical configuration described above with reference to FIG. 1.

The GGSN 212 is part of the wireless communications network 216, although it is illustrated as a separate element for convenience. The GGSN 212 interfaces with other network elements of the wireless communications network 216 such as core circuit network elements and core packet network elements, as described in greater detail herein below with reference to FIG. 8. The wireless communications network 216 may operate using telecommunications standards such as Global System for Mobile communications (GSM) and a Universal Mobile Telecommunications System (UMTS) to facilitate transmission of data received at the GGSN 212 from the SCADA devices 208 via the GFEP 206 through the wireless service provider domain 204 to the AMI devices 124 of the AMI domain 122. The wireless communications network 216 may alternatively or additionally use any existing, developing, or yet to be developed telecommunications technologies. Some examples of other suitable telecommunications technologies include, but are not limited to, networks utilizing Time Division Multiple Access (TDMA), Frequency Division Multiple Access (FDMA), Wideband Code Division Multiple Access (WCDMA), CDMA2000, Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

The wireless communications network 216 also interfaces with one or more radio access networks (RANs) 218 which, in turn, are in communication with the AMI domain 122 and, particularly, with the AMI devices 124 via respective AMI device transceivers 126. The RAN 218 is configured in accordance with the wireless telecommunications standards supported by the wireless communications network 216.

Network Configuration Using Co-Located GGSN/GFEP System

Figure 3:
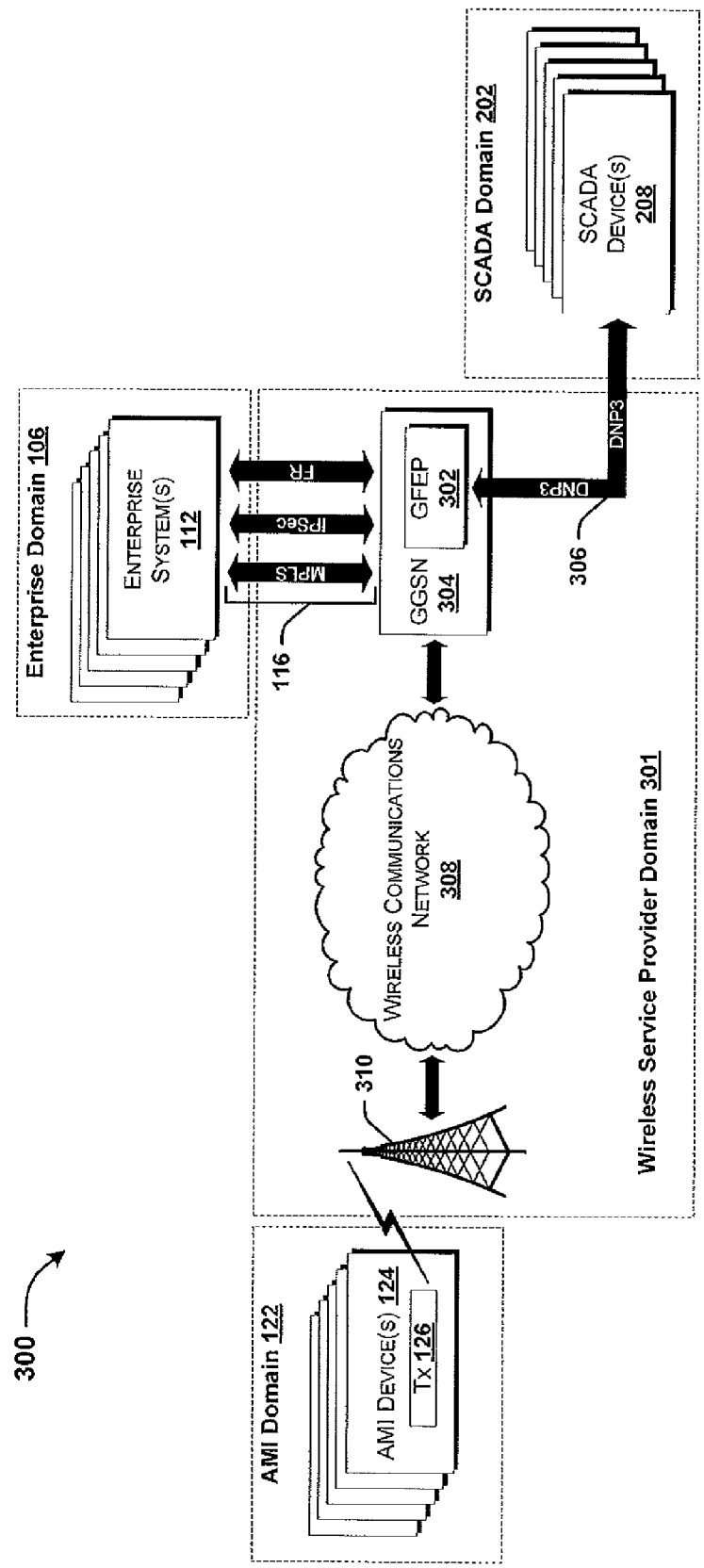
FIG. 3 schematically illustrates a network for facilitating inter-domain communications between a SCADA domain and a wireless service provider domain via a GFEP system, according to another embodiment.

Turning now to FIG. 3, a network 300 for facilitating inter-domain communications between a SCADA domain 202 and a wireless service provider domain 301 via a GFEP 302 is illustrated, according to an embodiment. In the illustrated embodiment, the GFEP 302 functions like the GFEP 206 of FIG. 2 but is logically associated with a GGSN 304 rather than being in communication with the GGSN 304. For example, the GFEP 302 may be physically co-located within a chassis shared with components of the GGSN 304 or the GGSN 304 may otherwise consider the GFEP 302 as functionally part of the GGSN 304 although the GFEP 302 is not physically co-located with the GGSN 304. The GFEP 302 may share software and/or hardware with the GGSN 304 for performing the functions a GFEP as described herein.

The GFEP 302 converts data received from the SCADA devices 208 via a DNP3 data link 306 or another data link layer protocol for use by the GGSN 304 in providing the data to a wireless communications network 308. The GGSN 304, like the GGSN 114 of FIG. 1 and the GGSN 212 of FIG. 2, can communicate with the enterprise domain 106, as needed, using the mechanisms 116 such as MPLS, frame relay, and/or IPSec. The GGSN 304 is also operatively coupled to a wireless communications network which, in the illustrated embodiment, is a wireless communications network 308. Functionally, with respect to communications to and from the enterprise domain 106 and to and from the wireless communications network 308, the GGSN 304 is the same as the GGSN 114 and the GGSN 212. The GGSN 304, however, includes additional functionality provided by the GFEP 302 for communicating data to/from the SCADA devices 208 and the AMI devices 124 without the need for a SCADA control center or intermediate communications through the enterprise domain 106.

The GGSN 304, in one embodiment, is part of the wireless communications network 308, although it is illustrated as a separate element for convenience. The GGSN 304 interfaces with other network elements of the wireless communications network 308 such as core circuit network elements and core packet network elements, as described in greater detail herein below with reference to FIG. 8. The wireless communications network 308 may operate using telecommunications standards such as Global System for Mobile communications (GSM) and a Universal Mobile Telecommunications System (UMTS) to facilitate transmission of data received at the GGSN 304 from the SCADA devices 208 via the GFEP 302 through the wireless service provider domain 301 to the AMI devices 124 of the AMI domain 122. The wireless communications network 308 may alternatively or additionally use any existing, developing, or yet to be developed telecommunications technologies. Some examples of other suitable telecommunications technologies include, but are not limited to, networks utilizing Time Division Multiple Access (TDMA), Frequency Division Multiple Access (FDMA), Wideband Code Division Multiple Access (WCDMA), CDMA2000, Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

The wireless communications network 308 also interfaces with one or more radio access networks (RANs) 310 which, in turn, are in communication with the AMI domain 122 and, particularly, with the AMI devices 124 via respective AMI device transceivers 126. The RAN 310 is configured in accordance with the wireless telecommunications standards supported by the wireless communications network 308.

Exemplary GFEP System Architecture

As described above in connection with FIGS. 2 and 3, a GFEP system, illustrated as the GFEP 206 and the GFEP 302, respectively, facilitates direct connectivity between a wireless service provider domain and a SCADA domain. The GFEP system may be embodied as a discrete network element as in the GFEP 206 or a logically combined GFEP/GGSN component as in the GFEP 302 and GGSN 304. In either case, the GFEP system includes various components described herein below with reference to FIG. 4.

Figure 4:
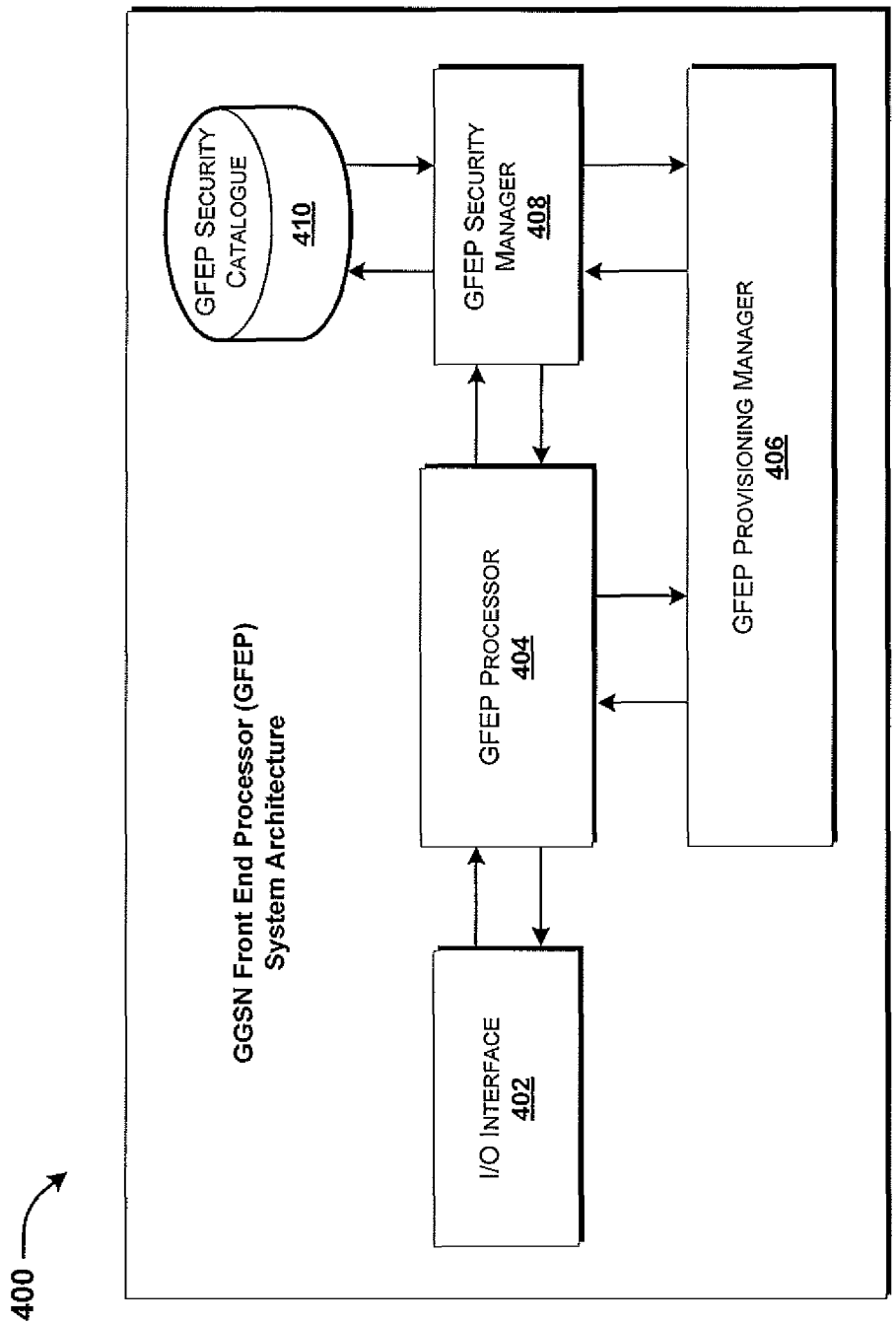
FIG. 4 schematically illustrates a GFEP system architecture, according to one embodiment.

Referring now to FIG. 4, architecture of an exemplary GFEP system 400 and components thereof is illustrated, according to one embodiment. The GFEP system 400 includes an input/output (I/O) interface 402 that is in communication with a GFEP processor 404. The GFEP processor 404 is in communication with a GFEP provisioning manager 406 and a GFEP security manager 408 which, in turn, is in communication with a GFEP security catalogue database 410.

The I/O interface 402 receives data directly from SCADA devices and delivers data converted by the GFEP processor 404 to one or more GGSNs. The GFEP processor 404 is configured to perform communications between SCADA devices and GGSNs. In particular, the GFEP processor 404 is configured to perform a protocol conversion to facilitate transfer of received data from SCADA devices to GGSNs and provide the received data to the GGSNs for delivery via a wireless communications network to one or more AMI devices.

The GFEP provisioning manager 406 configures each of at least one connection of the GFEP system 400 to at least one SCADA device. For example, the GFEP system 400 may have multiple connections each of which is for communicating with a specific SCADA device or group of SCADA devices. Each connection is provisioned by the GFEP provisioning manager 406 with parameters such as connection type, protocols used, addressing parameters (e.g., source and destination addresses), and transmission restrictions, if any.

The GFEP security catalog database 410 is a repository which stores security profiles for each GFEP connection. Each security profile record contains detailed information about the type of connection, SCADA device characteristics, protocols allowed, addresses allowed, amount of data allowed to be transmitted and/or received, and other relevant information associated with each SCADA device and each connection. The GFEP security catalog 410, in some embodiments, is a lightweight directory access protocol (LDAP) database, a relational database, or a proprietary database. Other database types are contemplated.

When a connection is made by a SCADA device to the GFEP system 400, the GFEP provisioning manager 406 interfaces with the GFEP security manager 408 and requests security information. This process may occur each time that a particular SCADA device makes a connection, upon first time connection, or never. The GFEP security manager 408 fetches appropriate records from the GFEP security catalogue database 410 and forwards this information to the GFEP provisioning manager 406 as requested. The GFEP provisioning manager 406 then uses this security data and/or the configuration parameters to configure the appropriate GFEP connection.

Exemplary Methods

While the processes or methods described herein may, at times, be described in a general context of computer-executable instructions, the present methods, procedures, and processes can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network nodes, single or multiple processor computers, hand-held computing devices, mobile communications devices, microprocessor-based consumer electronics, programmable electronics, network elements, gateways, network functions, devices, combinations thereof, and the like. In particular, the following methods may be executed by a GFEP system 400, such as described above.

It should be understood that the steps of the following methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated methods can be ended at any time. In certain embodiments, some or all steps of these methods, and/or substantially equivalent steps can be performed by execution of computer-readable instructions stored or included on a non-transitory computer-readable medium of the above-described GFEP system 400.

Figure 5:
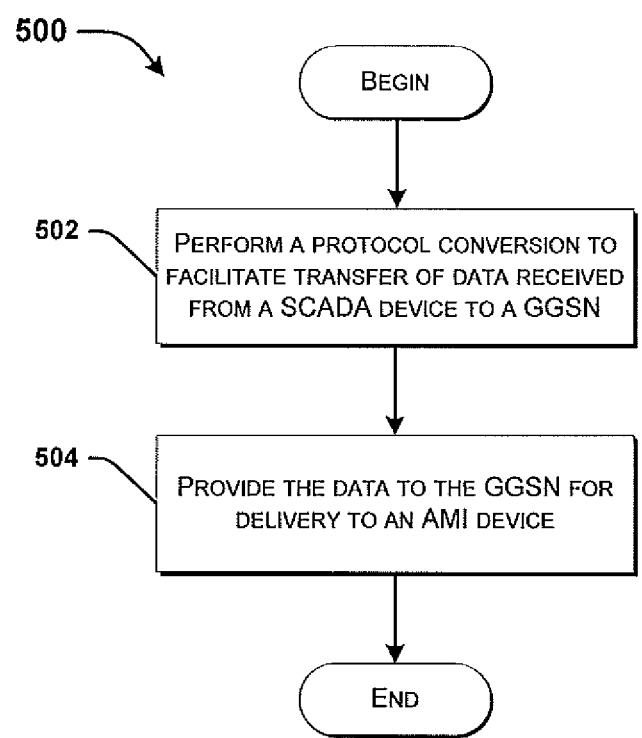
FIG. 5 illustrates a method for operating a GFEP system, according to one embodiment.

Referring now to FIG. 5, a method 500 for operating a GFEP system 400 to facilitate inter-domain communications between a SCADA domain and a wireless service provider domain is illustrated, according to one embodiment. The method 500 begins and flow is to block 502, whereat the GFEP system 400 performs a protocol conversion to facilitate transfer of data received from one or more SCADA devices, such as one or more of the SCADA devices 208 operating in the SCADA domain 202 to one or more GGSNs, such as one or both of the GGSNs 212, 304, or others operating in the wireless service provider domains 204, 301, respectively. At block 504, the GFEP system 400 provides the data to the one or more GGSNs for delivery to one or more AMI devices, such as one or more of the AMI devices 124 operating in the AMI domain 122. The GGSN(s) receiving the data sends the data to the destination AMI device(s) via a wireless communications network such as one of the wireless communication networks 216, 308. The method 500 can end.

Figure 6:
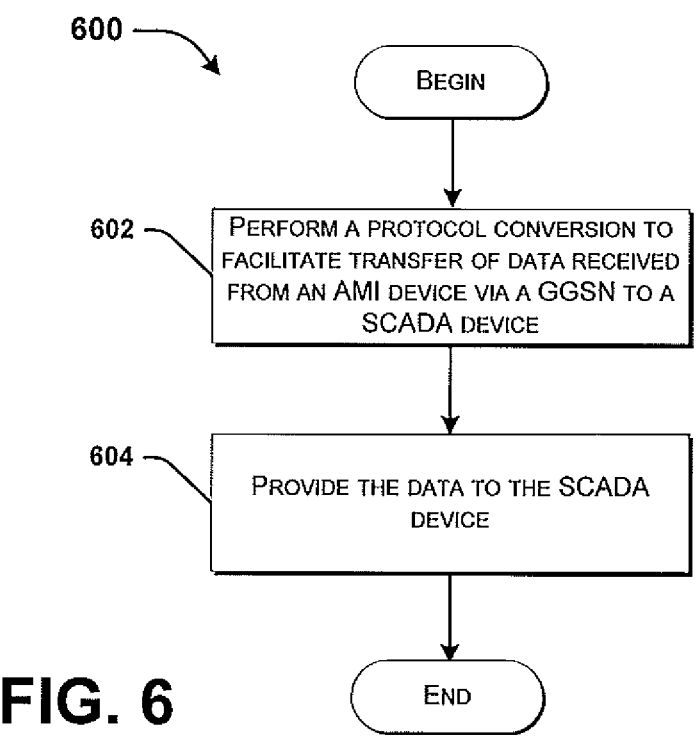
FIG. 6 illustrates a method for operating a GFEP system, according to another embodiment.

Referring now to FIG. 6, a method 600 for operating a GFEP system 400 to facilitate inter-domain communications between a SCADA domain and a wireless service provider domain is illustrated, according to another embodiment. The method 600 begins and flow is to block 602, whereat the GFEP system 400 performs a protocol conversion to facilitate transfer of data receive from an AMI device via a GGSN that is in communication with the GFEP system 400 to a SCADA device operating in the SCADA domain. At block 604, the GFEP system 400 provides the data to the appropriate SCADA device. The method 600 can end.

Figure 7:
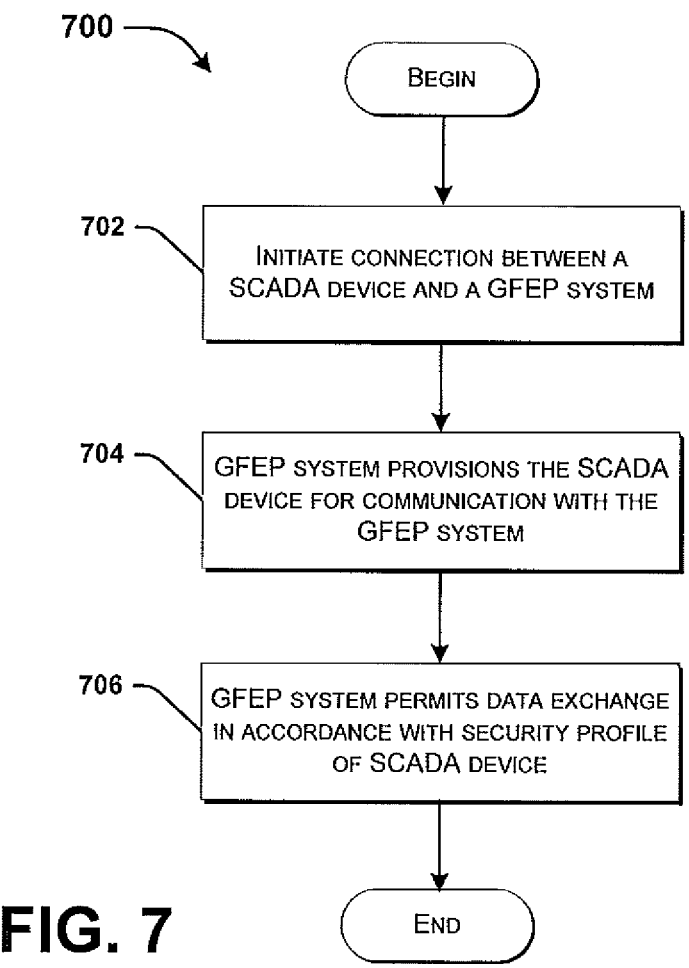
FIG. 7 illustrates a method for provisioning a SCADA device for communications with a GFEP system, according to one embodiment.

Referring now to FIG. 7, a method 700 for provisioning a SCADA device for communications to/from the GFEP system 400 is illustrated, according to one embodiment. The method 700 begins and flow is to block 702, whereat a connection is initiated between a SCADA device, such as one of the SCADA devices 208 operating in the SCADA domain 202, and the GFEP system 400. The connection may be initiated by the SCADA device or the GFEP system 400. At block 704, the GFEP system 400 provisions the SCADA device for communication with the GFEP system using configuration parameters and security profile details of the SCADA device. At block 706, the GFEP system 400 permits data exchange in accordance with the security profile for the SCADA device. The method 700 can end. In alternative embodiments, the GFEP system 400 provisions the SCADA device using only the configuration parameters. In some embodiments, the security profiles are maintained by an enterprise, the wireless service provider operating the GFEP system 400, or a third party.

Exemplary Wireless Communications Network

Figure 8:
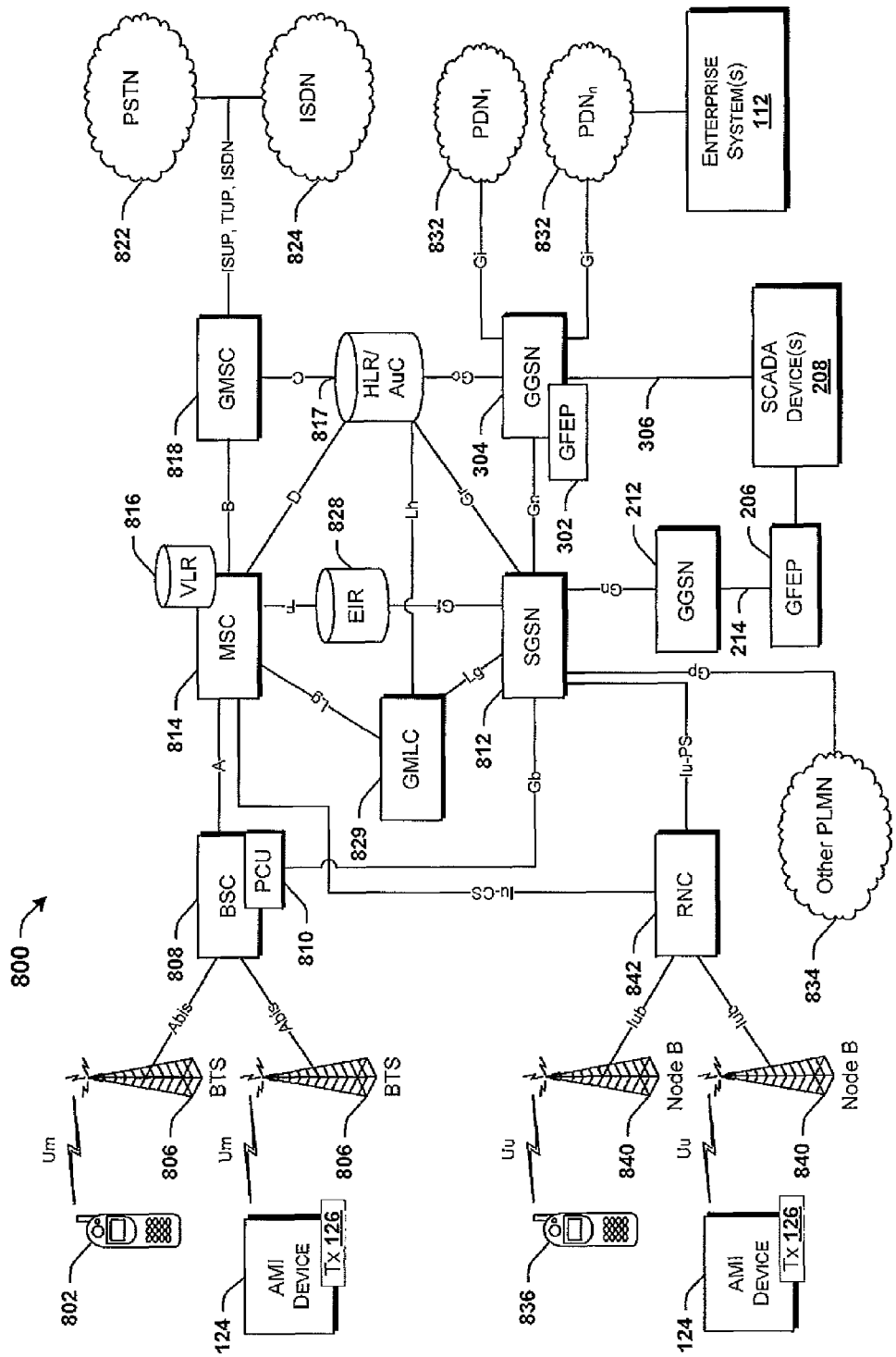
FIG. 8 schematically illustrates a wireless communications network in which some embodiments may be implemented.

Referring now to FIG. 8, an exemplary wireless communications network 800 is illustrated. The wireless communications network 800 includes the GFEP 206 and the GFEP 302. One or both configurations and multiples thereof may be used in actual implementations. The other components of the wireless communications network 800 are exemplary of those of the wireless communications networks 216, 308 illustrated, respectively, in FIGS. 2 and 3. Details of the wireless communications network 800 are now described.

The communications network 800 includes two RANs. A first RAN, illustrated in the upper left hand portion of FIG. 8, is dedicated to GSM-based radio network access. A second RAN, illustrated in the lower left hand portion of FIG. 8, is dedicated to UMTS-based radio network access. The innovative aspects of the present disclosure may be implemented in alternative networks that use other access technologies, as described above. The first RAN is now described.

The illustrated communications network 800 includes a Mobile Station (MS) 802 and an AMI device 124 that are each in communication with a Base Transceiver Station (BTS) 806 via the Um radio (air) interface. The AMI device 124 is in communication with the BTS 806 via the AMI device transceiver 126, described above. The BTSs 806 are terminating nodes for the radio interface in the illustrated first RAN. Each BTS 806 includes one or more transceivers and is responsible for ciphering of the radio interface.

In the illustrated embodiment, the MS 802 is a mobile device, although it may alternatively be a computer, such as a laptop with an integrated or external, removable GSM access card. The MS 802 includes mobile equipment, such as, but not limited to, one or more of keyboards, screens, touch screens, multi-touch screens, radio transceivers, circuit boards, processors, memory, Subscriber Identity Modules (SIM), Universal SIMs (USIM), or Universal Integrated Circuit Card (UICC) that contains subscriber information to enable network access to the wireless communications network 800, and the like.

Each BTS 806 is in communication with a Base Station Controller (BSC) 808 via the Abis interface. Typically, a BSC has tens or even hundreds of BTSs under its control. The BSC 808 is configured to allocate radio resources to the MS 802 and the AMI device 124, administer frequencies, and control handovers (typical for the MS 802 and less so for the AMI device 124, although mobile AMI devices are contemplated) between BTSs 806 (except in the case of an inter-Mobile Switching Center (MSC) handover in which case control is in part the responsibility of the MSC). One function of the BSC 808 is to act as a concentrator, so that many different low capacity connections to the BTS 806 become reduced to a smaller number of connections towards the MSC. Generally, this means that networks are often structured to have many BSCs 808 distributed into regions near the BTSs 806, which are in turn connected to large centralized MSC sites. Although illustrated as a distinct element, the functions provided by the BSC 808 may alternatively be incorporated in the BTS 806. The Abis interface is eliminated in such a configuration.

The BSC 808 is logically associated with a Packet Control Unit (PCU) 810 when GPRS capabilities are employed. The PCU 810 is configured to support radio related aspects of GPRS/EDGE when connected to a GSM network. The PCU 810 is in communication with a Serving GPRS Support Node (SGSN) 812 via the Gb interface. The SGSN 812 records and tracks the location of each mobile device and AMI device (although in some cases stationary) in the wireless communications network 800. The SGSN 812 also provides security functions and access control functions.

The BSC 808 is also in communication with an MSC 814 via an A interface. The MSC 814 is configured to function as a telecommunications switch. The MSC 814 is in communication with location databases, such as a Visiting Location Register (VLR) 816 and a Home Location Register (HLR) 817. The VLR 816 may be logically associated with the MSC 814 as illustrated or may be provided as a separate network element in communication with the MSC 814. The VLR 816 is a database configured to store all subscriber data that is required for call processing and mobility management for mobile subscribers that are currently located in an area controlled by the VLR 816.

The HLR 817 is in communication with the MSC 814 and VLR 816 via the D interface. The HLR 817 is a database configured to provide routing information for mobile terminated calls and various messaging communications. The HLR 817 is also configured to maintain subscriber data that is distributed to the relevant VLR (e.g., the VLR 816) or the SGSN 812 through an attach process and to provide mobility management procedures, such as location area and routing area updates. The HLR 817 may be logically associated with an Authentication Center (AuC) as illustrated or may be provided as a separate network element in communication with the HLR 817.

The AuC is configured to authenticate each UICC/SIM/USIM that attempts to connect to the wireless telecommunications network 800, for example, when a mobile device is powered on. Once authenticated, the HLR 817 is allowed to manage the UICC/SIM/USIM and services provided to the MS 802. The AuC also is capable of generating an encryption key that is used to encrypt all wireless communications between the MS 802 and the wireless communications network 800.

The MSC 814 is also in communication with a Gateway MSC (GMSC) 818 via the B interface. The GMSC 818 is configured to provide an edge function within a Public Land Mobile Network (PLMN). The GMSC 818 terminates signaling and traffic from a Public Switched Telephone Network (PSTN) 822 and an Integrated Service Digital Network (ISDN) 824, as illustrated and/or or other networks, and converts the signaling and traffic to protocols employed by the wireless communications network 800. The GMSC 818 is in communication with the HLR/AuC 817 via the C interface to obtain routing information for mobile terminated calls originating from fixed network devices such as, for example, landline telephones that are in communication with the mobile network via the PSTN 822.

The MSC 814 is also in communication with an EIR (Equipment Identity Register) 828 via an F interface. The EIR 828 is a database that can be configured to identify subscriber devices that are permitted to access the wireless communications network 800. An IMEI (International Mobile Equipment Identity) is a unique identifier that is allocated to each mobile device and is used to identify subscriber devices in the EIR 828. The IMEI includes a type approval code, a final assembly code, a serial number, and a spare digit. An IMEI is typically placed in the EIR 828 once its operation has been certified for the infrastructure of the network 800 in a laboratory or validation facility.

The SGSN 812 and the MSC 814 are also in communication with a gateway mobile location center (GMLC) 829 via an Lg interface. The GMLC 829 can communicate with the HLR/AUc 817 via an Lh interface to acquire routing information.

The EIR 828 and the HLR/AuC 817 are each in communication with the SGSN 812 via the Gf interface and the Gr interface, respectively. The SGSN 812, in turn, is in communication with one or more GGSNs such as the GGSN 212 and the GGSN 304 via the Gn interface. The GGSNs 212, 304 are configured to provide an edge routing function for the packet core network to external packet data networks (PDNs) 832 via the Gi interface, such as the Internet and one or more intranets, for example, enterprise data networks. In the illustrated embodiment, one of the PDNs 832 provides connectivity to the enterprise systems 112. The GGSNs 212, 304 include firewall and filtering functionality. The HLR/AuC 817 is in communication with the GGSN 304 via the Gc interface and may also be in communication with the GGSN 212, although such connection is not illustrated.

The GGSN 212 is in communication with the GFEP 206 via the data link/interface 214. The GFEP 206 performs appropriate protocol conversion at the layer 2, the data link layer of the OSI model. In particular, the GFEP 206 converts communications received from the SCADA devices 208 according to DNP3, Modbus, Modbus X, Multispeak, or similar protocol to another data link protocol useable by the GGSN 212, such as a data link layer protocol of the Internet Protocol Suite (TCP/IP). The GFEP 206, in some embodiments, includes an embedded SCADA application to facilitate communications with one or more of the SCADA devices 208. The GFEP 302 is logically associated with the GGSN 304 and performs the same functions as the GFEP 206.

The SGSN 812 is also in communication with other PLMNs 834 via an external GGSN (not shown). The external GGSN provides access to the other PLMNs 834. The other PLMNs 834 may be, for example, a foreign network, such as, a wireless communications network operated by another service provider or the same service provider.

The second RAN, illustrated in the lower left hand portion of FIG. 8, is dedicated to UMTS-based network access and is now described. The illustrated wireless communications network 800 also includes a UE (User Equipment) 836 and another AMI device 124 that are each in communication with a Node B 840 via the Uu radio (air) interface. The Node B 840 is the terminating node for the radio interface in the second RAN. Each Node B 840 includes one or more transceivers for transmission and reception of data across the Uu radio interface. Each Node B 840 is configured to apply the codes to describe channels in a COMA-based UMTS network. Generally, the Node 13 840 performs similar functions for the UMTS network that the BTS 806 performs for the GSM network.

In the illustrated embodiment, the UE 836 is a mobile phone or, alternatively, a computer, such as a laptop with an integrated or external, removable UMTS card. The UE 836 includes mobile equipment, such as one or more of keyboards, screens, touch screens, multi-touch screens, radio transceivers, circuit boards, processors, memory, SIMs, USIMs, or UICCs that contains subscriber information to enable network access to the wireless telecommunications network 800, and the like. Generally, the UE 836 performs similar functions in the UMTS network that the MS 802 performs in the GSM network.

Each Node B 840 is in communication with a Radio Network Controller (RNC) 842 via the Iub interface. The RNC 842 is configured to allocate radio resources to the UE 836, administer frequencies, and control handovers between Node Bs 840 (and others not shown). Although illustrated as a distinct element, the RNC 842 functions may alternatively be located within the Node Bs 840. In this configuration the Iub interface is eliminated. Generally, the RNC 842 performs similar functions for the UMTS network that the BSC 808 performs for the GSM network.

The RNC 842 is in communication with the MSC 814 via an Iu-CS interface. The RNC 842 is also in communication with the SGSN 812 via an Iu-PS interface. The other network elements perform the same functions for the UMTS network as described above for the GSM network.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A front end processor system, comprising:
   an input/output interface configured to receive data directly from a supervisory control and data acquisition device, the received data being for at least one of monitoring and controlling an advanced metering infrastructure device;
   a processor being configured to:
      perform a protocol conversion to facilitate transfer of the received data from the supervisory control and data acquisition device to a general packet radio service gateway support node of a wireless communications network; and
      provide the received data to the general packet radio service gateway support node for delivery via the wireless communications network to the advanced metering infrastructure device;
   a provisioning manager being configured to provision at least one connection between the supervisory control and data acquisition device and the front end processor system with configuration parameters comprising at least one of a connection type, a protocol used, a source address, a destination address, and a transmission restriction;
   a security catalog database configured to store a security profile for the at least one connection, each security profile comprising at least one of a connection type, a supervisory control and data acquisition device characteristic, an allowed protocol, an allowed address, a data transmitted amount, and a data received amount; and
   a security manager being configured to:
      receive, in response to a particular connection of the at least one connection between the supervisory control and data acquisition device and the front end processor system being initiated, a request for security information from the provisioning manager;
      fetch, in response to the request for security information, the security profile associated with the supervisory control and data acquisition device from the security catalog database; and
      forward the security profile associated with the supervisory control and data acquisition device to the provisioning manager,
   wherein the provisioning manager is further configured to use the security profile to provision the particular connection.

2. The front end processor system of claim 1, wherein in being configured to perform a protocol conversion, the processor is configured to perform a data link layer protocol conversion.

3. The front end processor system of claim 2, wherein in being configured to perform the data link layer protocol conversion, the processor is configured to convert the received data from a first protocol used by the supervisory control and data acquisition device and selected from a group of first protocols consisting of Distributed Network Protocol, Modbus, Modbus X, and Multispeak to a second protocol used by the general packet radio service gateway support node, the second protocol being a data link layer protocol of the Internet Protocol Suite.

4. The front end processor system of claim 1, wherein the processor is part of the general packet radio service gateway support node.

5. The front end processor system of claim 1, wherein the supervisory control and data acquisition device is associated with at least one of electricity generation, electricity transmission, electricity distribution, a manufacturing process, a production process, a fabrication process, a refining process, water treatment, water distribution, wastewater collection, wastewater treatment, natural gas distribution, natural gas collection, oil distribution, oil collection, a defense system monitoring process, a security system monitoring process, a heating, ventilation, and air conditioning process, and energy consumption.

6. The front end processor system of claim 1, wherein the automated metering infrastructure device is a smart grid device.

7. A network architecture for facilitating inter-domain communications between a supervisory control and data acquisition domain and a wireless service provider domain, the network architecture comprising:
a general packet radio service gateway support node;
a front end processor system, the front end processor system being configured to:
perform a protocol conversion to facilitate transfer of data received from the supervisory control and data acquisition domain to the wireless service provider domain;
provide the data to the general packet radio service gateway support node for delivery via a wireless communications network of the wireless service provider domain to an automated metering infrastructure device;
provision at least one connection of the front end processor system to a supervisory control and data acquisition device of the supervisory control and data acquisition domain with configuration parameters comprising at least one of a connection type, a protocol used, a source address, a destination address, and a transmission restriction;
receive, in response to a particular connection of the at least one connection between the supervisory control and data acquisition device and the front end processor system being initiated, a request for security information;
fetch, in response to the request for security information, the security profile associated with the supervisory control and data acquisition device from a security catalog database storing a security profile for the at least one connection, each security profile comprising at least one of a connection type, a supervisory control and data acquisition device characteristic, an allowed protocol, an allowed address, a data transmitted amount, and a data received amount, wherein the security profile associated with the supervisory control and data acquisition device is used to provision the particular connection.

8. The network architecture of claim 7, wherein the supervisory control and data acquisition device is associated with at least one of electricity generation, electricity transmission, electricity distribution, a manufacturing process, a production process, a fabrication process, a refining process, water treatment, water distribution, wastewater collection, wastewater treatment, natural gas distribution, natural gas collection, oil distribution, oil collection, a defense system monitoring process, a security system monitoring process, a heating, ventilation, and air conditioning process, and energy consumption.

9. The network architecture of claim 7, wherein in being configured to perform a protocol conversion, the front end processor system is configured to perform a data link layer protocol conversion.

10. The network architecture of claim 9, wherein in being configured to perform the data link layer protocol conversion, the front end processor system is configured to convert the data from a first protocol used by the supervisory control and data acquisition device and selected from a group of first protocols consisting of Distributed Network Protocol, Modbus, Modbus X, and Multispeak to a second protocol used by the general packet radio service gateway support node, the second protocol being a data link layer protocol of the Internet Protocol Suite.

11. The network architecture of claim 7, wherein the supervisory control and data acquisition device is associated with at least one of electricity generation, electricity transmission, electricity distribution, a manufacturing process, a production process, a fabrication process, a refining process, water treatment, water distribution, wastewater collection, wastewater treatment, natural gas distribution, natural gas collection, oil distribution, oil collection, a defense system monitoring process, a security system monitoring process, a heating, ventilation, and air conditioning process, and energy consumption.

12. The network architecture of claim 7, wherein the automated metering infrastructure device is a smart grid device.

13. The network architecture of claim 7, wherein the front end processor system is in communication with the general packet radio service gateway support node.

14. The network architecture of claim 7, wherein the front end processor system is integrated within the general packet radio service gateway support node.

15. A method for facilitating inter-domain communications between a supervisory control and data acquisition domain and a wireless service provider domain, the method comprising:
performing, by a processor of a front end processor system, a protocol conversion to facilitate transfer of data received from a supervisory control and data acquisition device of the supervisory control and data acquisition domain to a general packet radio service gateway support node of the wireless service provider domain;
providing the data to the general packet radio service gateway support node for delivery via a wireless communications network of the wireless service provider domain to an automated metering infrastructure device;
provisioning, by a provisioning manager, at least one connection of the front end processor system to the supervisory control and data acquisition device with configuration parameters comprising at least one of a connection type, a protocol used, a source address, a destination address, and a transmission restriction;
receiving, by a security manager, in response to a particular connection of the at least one connection between the supervisory control and data acquisition device and the front end processor system being initiated, a request for security information from the provisioning manager;

fetching, in response to the request for security information, the security profile associated with the supervisory control and data acquisition device from a security catalog database storing a security profile for the at least one connection, each security profile comprising at least one of a connection type, a supervisory control and data acquisition device characteristic, an allowed protocol, an allowed address, a data transmitted amount, and a data received amount; and forwarding, by the security manager, the security profile associated with the supervisory control and data acquisition device to the provisioning manager, wherein the provisioning manager uses the security profile to provision the particular connection.

16. The method of claim 15, wherein performing the protocol conversion comprises converting the data received according to a first protocol used by the supervisory control and data acquisition device and selected from a group of first protocols consisting of Distributed Network Protocol Modbus, Modbus X, and Multispeak to a second protocol used by the general packet radio service gateway support node, the second protocol being a data link layer protocol of the Internet Protocol Suite.

17. The method of claim 15, wherein the automated metering infrastructure device is a smart grid device.

* * * * *